3,388,069
LIQUID ACTIVE OXYGEN DETERGENT BLEACHING CONCENTRATE

Kurt Lindner and Elfriede Eichler, Berlin-Lichterfelde, Germany, assignors to Henkel & Cie G.m.b.H., Dusseldorf, Germany, a corporation of Germany
No Drawing. Filed Dec. 21, 1964, Ser. No. 420,181
Claims priority, application Germany, Jan. 4, 1964, H 51,286
10 Claims. (Cl. 252—99)

This invention relates to liquid concentrates containing active oxygen and having surface-active properties. More specifically, this invention relates to aqueous concentrates of per-oxygen compounds, such as hydrogen peroxide and the like, and a surface-active aminoxide stabilizer.

It is difficult to stabilize active oxygen compounds contained in a liquid, such as aqueous concentrates of per-compounds, specifically hydrogen peroxide and the like in aqueous media in the presence of tensides, so that the concentrates will have adequate storage life when stocked for either industrial or domestic use, such as industrial laundries, hair-dressers' shops and domestic cleaning agents. This is due to the fact that most of the known tensides induce the premature splitting of active oxygen from percompounds. Findings to the contrary are infrequent, as discussed in German Auslegeschrift 1,121,594.

Stabilizing agents comprising non-tenside compounds are well known and include inorganic and organic acids, such as ortho- or polyphosphoric acids, tannic acids, citric acid, barbituric acid, ascorbic acids, and the like, in addition to acid salts, such as acid sodium pyrophosphate, and many other organic compounds, such as acetophenetidin, acetanilide or 8-oxyquinoline, to name only a few. Other compounds are disclosed in "Das Wasserstoffperoxyd und die Perverbindungen," W. Machu, 2nd edition, Vienna 1951, pp. 195 to 208.

Many of the stabilizers are known and described in the prior art, such as magnesium salts, and especially magnesium silicates, in addition to alkali-pyrophosphates or alkali polyphosphates, alkali stannates, alkali silicates, and others are used for regulating the degree to which oxygen is liberated in diluted and ready-to-use washing and bleaching fluids containing per-oxygen compounds. These stabilizers are also used to prevent fiber damage in washing and bleaching processes. On the other hand, most of the known stabilizing agents, with the exception of the above-named acids, acid salts, and a small number of organic compounds, are not suitable for manufacturing liquid concentrates containing oxygen, which are capable of long storage life.

It has been relatively difficult to stabilize percompounds utilizing the compositions and methods of the prior art, and especially concentrates with peroxide contents of at least 3 weight percent hydrogen peroxide and even substantially higher active oxygen contents, so that they may be stored in commerce, trade and industry for a number of days or even weeks, in ready-to-use form, but without danger of decomposition.

It is therefore an object of this invention to provide a method for stabilizing per-compounds, specifically per-oxygen compounds, and the like, for long periods of time without decomposition. Another object of this invention is to provide a liquid concentrate containing active oxygen and having surface-active properties, whereby the surface-active agent (tenside) will not induce premature splitting of the active oxygen in the per-compound. It is another object of this invention to provide a novel and useful surface-active compound. It is another object of this invention to provide a novel stabilizing compound that, additionally, has surface-active properties and will act as a per-compound stabilizer.

These and other objects have been achieved by the discovery that surface-active aminoxides are especially well suited for the stabilization of active oxygen contained in liquids, especially aqueous concentrates of per-compounds, such as hydrogen peroxides or its adducts.

The surface-active aminoxides of this invention are valuable tensides which have detergent or wetting properties which vary according to the nature and structure of the alkyl side-chains attached to the amine compound. These properties of high-molecular-weight aminoxide now make it possible to manufacture combined detergent-bleaching concentrate, in which the bleaching compound comprises active oxygen-containing materials, such as compounds of hydrogen peroxide or adducts of hydrogen peroxide to urea, melamine, alkali borates, alkali ortho-phosphates, alkali polyphosphates, or the like. The compositions of this invention are in marked contrast to prior art compositions which employ stabilizing agents that lack surface-active properties. The surface-active properties of prior art compositions are obtained by the addition of tensides to the oxygen compound, which, as a rule, nullify or counteract the stabilizing agents and promote relatively rapid loss of active oxygen from the composition.

The aminoxides of this invention comprise compounds having a total of 10 to 24 carbon atoms, but perferably 14 to 16 carbon atoms, and are derived from tertiary amines containing one or more saturated higher alkyl radicals. Especially valuable aminoxides are those which, in addition of a total of two methyl and/or ethyl radicals and/or oxyethyl and/or monoxypropyl or dioxypropyl radicals, also contain an alkyl radical of high molecular weight, so that the sum of the carbon atoms in the alkyl radicals amounts to at least 10, and preferably 14 to 16. Examples of aminoxides, according to the invention, include lauryl dimethyl aminoxide, lauryl diethyl aminoxide, myristyl dimethyl aminoxide, myristyl diethyl aminoxide, cetyl dimethyl aminoxide, cetyl diethyl aminoxide, or aminoxides which, instead of the above-named alkyl radicals of high molecular weight, contain 8–10 or 18 carbon atoms, or, alternately, contain one methyl or one ethyl radical, instead of the two low-molecular-weight methyl or ethyl radicals. Aminoxides, however, can also be used which contain two high-molecular-weight or only one low-molecular-weight alkyl radical such as dihexyl ethyl aminoxide, dioctyl methyl aminoxide or the like, providing the aminoxides are sufficiently water-soluble for effective use as stabilizers of aqueous hydrogen peroxide compounds, or compositions. Either the methyl and/or ethyl radicals of these compounds, however, can be replaced by oxyethyl, oxypropyl or dioxypropyl radicals.

The aminoxides of this invention are manufactured by the condensation of high-molecular-weight alcohols, such as lauryl alcohol, myristyl alcohol, coconut fatty alcohols, cetyl alcohol or mixtures of such alcohols with dimethylamine or diethylamine, followed by oxidation. Water-solubility of these compounds is effected by the hydrophilic nature of the aminoxide-group and by any free hydroxyl group or groups that may be present.

The surface-active aminoxides of this invention have especially pronounced stabilizing effects in an acid-to-neutral milieu, i.e., at a pH from 1 to 7. For example, the aminoxide may be used in a strongly acid (pH of 2 to 4), or weakly acid (from 4 to 6.8) environment or vary from 3 to 8. Stabilization, however, may also be achieved from several days to several weeks in a weakly alkaline milieu, i.e., at a pH from 7.2 to 8.

If the shelf life requirements are less stringent, as, for example, in the laundry industry, the pH of the environment may be made more strongly alkaline. For example, a pH up to about 10 is suitable for this purpose. The shelf life of the concentrates, however, decreases as the alkalinity increases, so that pH values over 10.5 do not give optimum results with respect to stability, however, concentrates having higher pH values may also be used.

The compositions of this invention may be stored as concentrates in a weakly acid, or neutral, or weakly alkaline mixture, which are adjusted to the desired higher pH values by the addition of alkaline or acidic compounds upon being used. Conventional alkaline reagents may be used for increasing the pH of the milieu. Alkaline salts are especially useful, such as those commonly used as additives in bleaching and washing, for example, the alkaline or alkali carbonates, bicarbonates, ortho-phosphates, pyro-phosphates, and poly-phosphates such as tripolyphosphates, borates, silicates, and the like, and various mixtures thereof. If the composition supplying the active oxygen comprises the perhydrates of the above-mentioned inorganic salts, the alkaline materials will generally be present in sufficient quantities, so that addition of other alkaline compounds will not generally be necessary.

Acidic substances may also be added to the compositions of this invention in order to lower the pH value to 9 or less. If condensed phosphates are to be used, the weakly acid glassy phosphates of the Graham salt type have proven to be particularly well suited for this purpose.

Non-reducing inorganic or organic acids or acid salts are used for adjusting the pH values in the acid range, if necessary. Phosphoric acid as well as the polyphosphoric acids, as mentioned above, are suitable in addition to sulfuric acid, citric acid, malonic acid, tartaric acid, ascorbic acid, and the like, or various mixtures thereof. Some of these acids are already well known in the prior art as oxygen stabilizers and, in some cases permit a reduction of the amount of aminoxides present in the composition of this invention, or their replacement by other tensides.

The expression "tenside" shall be construed in the specification and claims of this application to mean any organic surface-active compound or the like, or "surfactant," as known and used in the prior art.

The amount of aminoxides serving as stabilizers in accord with this invention can vary within wide limits. These compounds may be present in quantities amounting to 2 to 40 percent by weight, and preferably 5 to 25 percent of the weight of the total composition. With reference to the hydrogen peroxide present in the free or bound state, the aminoxides are present in quantities of at least 10 percent by weight, however, may be used in amounts of up to 200 percent by weight, and preferably in amounts from 30 to 100 percent by weight.

The aminoxides of this invention may be used in combination with other substances in the preparation of compositions containing active oxygen. These substances generally comprise tensides of the carboxylate, sulfate and sulfonate type having saturated molecular hydrophobic radicals attached thereto. Non-ionogenic tensides are particularly suitable, especially those comprising the addition of ethylene oxide to either fatty acids or fatty alcohols in addition to the ethylene oxide addition products of saturated alkyl phenols, such as the nonyl phenols. The mixed ethylene oxide-propylene oxide products of the pluronic or tetronic types are also suitable. Pluronic compounds are generally high molecular weight poly-propylene glycol ethers, which are rendered water-soluble by the addition of ethylene oxide to the molecular chain, whereas the tetronic types generally comprise addition products of propylene oxide and diamines such as ethylene diamine. Other compounds suitable in this respect comprise alkali metal pyrophosphates or polyphosphates. These compounds may be used in the form of their acid salts or as acidified preparations Additionally, hydrotropic substances may also be used in the compositions of this invention. Examples of suitable hydrotropic compounds comprise the alkali metal salts of toluenesulfonic acid or xylenesulfonic acid. Dirt holders, such as carboxymethylcelluloses or oxidation-resistant optical brighteners, can also be present.

The term "liquid concentrates containing active oxygen" shall be understood hereby to mean aqueous solutions with a content of at least 3 to 90 weight percent, and preferably 10 to 40 weight percent, of $H_2O_2$. The $H_2O_2$ may also be present, wholly or partially, in the form of addition products which it forms with urea, melamine, alkali borates, alkali ortho-phosphates or polyphosphates, or the like, which have been dissolved or suspended in water. The concentration of any undissolved hydrogen peroxide compounds that may be present in the liquid concentrates containing active oxygen ranges from 3 to 40 weight percent, and preferably from 10 to 25 weight percent.

The following non-limiting examples are given as certain preferred embodiments of the invention and are not to be construed as narrowing the novel and inventive method and composition of the applicants. In all of the examples below standard commercial hydrogen peroxide of technical quality was used.

EXAMPLES I–III

A concentrate comprising approximately 10 percent by weight of hydrogen peroxide is prepared by mixing 33.3 parts by weight of 30-percent hydrogen peroxide, 6.7 parts by weight of lauryl dimethyl aminoxide and 60 parts of distilled water. This concentrate is divided into three portions, and the pH of each is adjusted to 3.4, 6.0 and 7.7, respectively, by the addition of either a dilute caustic soda solution or dilute sulfuric acid, according to the case. The temperature of the three solutions is maintained at 20–22° C. The oxygen losses during storage in polyethylene containers is determined by titration with potassium permanganate, the results of which are listed in the following table, Table I.

TABLE I
[Oxygen loss in percent of initial value=100]

|  | Examples | | |
| --- | --- | --- | --- |
|  | I | II | III |
|  | | pH | |
|  | 3.4 | 6.0 | 7.7 |
| 1 Day | 0 | 0 | 0 |
| 3 Days | 0 | 0 | 1.04 |
| 1 Week | 0 | 0.59 | 2.53 |
| 2 Weeks | 0.11 | 0.68 | 4.95 |
| 4 Weeks | 0.21 | 0.98 | 7.55 |
| 6 Weeks | 1.10 | 1.92 | 9.24 |

It can be seen from the data of Table I that the stability of the concentrates thus prepared improves as the pH is lowered. Whereas the alkalin pH of Example III results in a concentrate that remains somewhat stable for several days, the acid pH systems of Examples I and II are kept stable for weeks. Concentrates prepared having a high pH are less suitable for applications where relatively long storage periods are encountered, without danger that the concentrate will lose active oxygen. Commercial laundry preparations, similar to Examples I and II, can thus be prepared of acid pH and may be kept stable for weeks and used as needed after adjusting to be desired pH value.

EXAMPLE IV

A stabilized preparation suitable for laundry and bleaching purposes which contains 15 percent hydrogen peroxide is prepared by dissolving 50 weight percent of 30-percent hydrogen peroxide, 5 weight percent of lauryl dimethyl aminoxide, 5 weight percent of an addition product of 13 mols of ethylene oxide to nonyl phenol, 2 weight percent of acid sodium pyrophosphate and the balance water to make a total of 100 weight percent of concentrate which is adjusted to a pH value of 4.85.

EXAMPLE V

A concentrate is prepared in substantially the same manner as that in Example IV, with the exception that potassium toluene sulfonate is omitted. The concentrates of Examples IV and V are stored in polyethylene bottles for 12 weeks at temperatures between 20 and 22° C. The active-oxygen loss of the concentrate of Example IV amounts to 0.75 percent, whereas the oxygen loss of the concentrate of Example V amounts to 0.79 percent. The differences in these two values are within a reasonable margin of error. Thus, as indicated, the potassium toluene sulfonate neither substantially adds nor distracts from the stability of the concentrates thus prepared.

EXAMPLE VI

A concentrate suitable for laundry and bleaching purposes containing 15 percent hydrogen peroxide is prepared by dissolving 50 weight percent of 30-percent hydrogen peroxide, 10 weight percent myristyl dimethyl aminoxide, 2 weight percent of potassium toluene sulfonate and 10 weight percent of tetarpotassiumpyrophosphate in distilled water to make 100 weight percent of the ready-to-use concentrate. The pH is adjusted to 5.9 by the addition of sulfuric acid. After storage for a total of 24 days, the loss of active oxygen amounts to 0.54 percent.

EXAMPLE VII

A concentrate containing 15 percent hydrogen peroxide is prepared as an Example VI, except the adjustment of the pH with sulfuric acid is omitted. The concentrate is used, having a pH as prepared, for laundry purposes and shows a loss of 1.55 percent of active oxygen after one week of storage.

EXAMPLE VIII

A concentrate is prepared containing 15 percent hydrogen peroxide in the same manner as described in Example VI, with the exception that 0.1 weight percent of acetophenetidin based on 100 weight percent of the total concentrate is added. The active oxygen of the concentrate shows substantially complete stability over a 6-week period.

EXAMPLE IX

A concentrate containing 15 percent hydrogen peroxide is prepared as in Example VI, with the exception that 0.2 weight percent of acetophenetidin based on 100 weight percent of the concentrate is added. The pH is then adjusted to 7.8 and the loss of active oxygen determined. This loss amounts to 1.9 percent after 4 weeks.

EXAMPLE X

A concentrate containing 15 percent hydrogen peroxide is prepared in substantially the same manner as in Example IX, however, the pH adjustment is omitted. The concentrate which is suitable for laundry purposes shows an active-oxygen loss of 0.9 percent after one week of storage at its unadjusted pH value.

EXAMPLES XI–XIII

Three hydrogen peroxide concentrates having the compositions given in Table II below are prepared in conjunction with lauryl dimethyl aminoxide (LDA aminoxide). The pH values of Examples XI and XII are not altered, and correspond to the pH of the tetrapotassiumpyrophosphate. The pH of the concentrate of Example XIII is adjusted to 5.9 by addition of sulfuric acid. The concentrates of Examples XI, XII and XIII are stored in polyethylene bottles at temperatures varying from 20 to 22° C. and are tested after 3 days, 2 weeks and 6 weeks to determine their active-oxygen content. The active-oxygen losses are given in Table II below as a percentage of the initial value.

TABLE II

| Examples | XI | XII | XIII |
|---|---|---|---|
| Composition of the concentrate in percent by weight: | | | |
| $H_2O_2$ | 15 | 15 | 15 |
| $K_2P_2O_7$ | 10 | 10 | 10 |
| LDA | | 10 | 10 |
| pH | Neutral | Neutral | 5.9 |
| Active-oxygen loss in percent after— | | | |
| 3 days | 1.3 | 0.1 | 0.0 |
| 2 weeks | 14.1 | 1.6 | 0.3 |
| 6 weeks | 37.0 | 6.6 | 0.4 |

Thus, there has been described a very effective method and composition for stabilization of liquid concentrates containing active oxygen by means of aminoxides in a strongly or weakly acid, neutral or weakly alkaline medium, and as such signifies a considerable advance in the art. The compositions of this invention are useful in such applications as cleaning and bleaching of textiles, the bleaching of human hair, the fixing of hairdos and other cosmetic treatments, and can be performed directly with such concentrates without requiring neutralization. Additionally, the fact that acidified perconcentrates containing substantial amounts of tensides can be stored for weeks and months and then be adjusted to the desired pH prior to use by the addition of appropriate alkalies or alkaline compounds, signifies another substantial advance in the art.

Although the invention has been described with reference to certain preferred embodiments, it is not the intention of the applicants to be limited thereby, and certain obvious modifications of the novel composition of matter and method are intended to be included within the broad scope of the invention, as embodied in the following claims.

What is claimed is:

1. A liquid storage-stable, active-oxygen containing detergent-bleaching concentrate consisting essentially of water, hydrogen peroxide in an amount of from 3 to 90 weight percent, and a water-soluble surface-active aminoxide having a total of 10 to 24 carbon atoms in its molecule containing a tertiary amine wherein the substituents attached to the N atom are each selected from the group consisting of alkyl and hydroxy alkyl, at least one substituent being of high molecular weight, in an amount of from 2 to 40 percent by weight, the quantity of aminoxide amounting to 10 to 200 weight percent referred to the hydrogen peroxide present, said concentrate having a pH of from 1 up to 10.0.

2. A liquid storage-stable active-oxygen containing detergent-bleaching concentrate according to claim 1, wherein said concentrate has a pH of from 3 to 8.

3. A liquid storage-stable active-oxygen containing detergent-bleaching concentrate according to claim 1, wherein said hydrogen peroxide is present in an amount of from 10 to 40 weight percent.

4. A liquid storage-stable active-oxygen containing detergent-bleaching concentrate according to claim 1, wherein said surface-active aminoxide is present in an amount of from 5 to 25 weight percent.

5. A liquid storage-stable active-oxygen containing detergent-bleaching concentrate according to claim 1, wherein the quantity of aminoxide referred to the hydrogen peroxide amounts to from 30 to 100 weight percent.

6. A liquid storage-stable active-oxygen containing detergent-bleaching concentrate according to claim 1 consisting essentially of 10 percent by weight hydrogen peroxide, 6.7 parts by weight of lauryl dimethyl aminoxide and 60 parts of distilled water and having a pH of 3.4.

7. A liquid storage-stable active-oxygen containing detergent-bleaching concentrate according to claim 1 consisting essentially of 15 percent by weight hydrogen peroxide, 5 weight percent lauryl dimethyl aminoxide, 5 weight percent of an addition product of 13 mols of ethylene oxide to nonyl phenol, 2 weight percent of potassium toluene sulfonate, 2 weight percent of acid sodium pyrophosphate and the balance water and having a pH of 4.85.

8. A liquid storage-stable active-oxygen containing detergent-bleaching concentrate according to claim 1 consisting essentially of 15 percent by weight hydrogen peroxide, 5 weight percent lauryl dimethyl aminoxide, 5 weight percent of an addition product of 13 mols of ethylene oxide to nonyl phenol, 2 weight percent of acid sodium pyrophosphate and the balance water and having a pH of 4.85.

9. A liquid storage-stable active-oxygen containing detergent-bleaching concentrate consisting essentially of 15 weight percent hydrogen peroxide, 10 weight percent myristyl dimethyl aminoxide, 2 weight percent of potassium toluene sulfonate, 10 weight percent of tetrapotassium-pyrophosphate and distilled water to make 100 weight percent and having a pH of 5.9.

10. A liquid storage-stable, active oxygen containing detergent-bleaching concentrate consisting essentially of water, hydrogen peroxide in an amount of from 3 to 90 wt.-percent and a water-soluble surface-active aminoxide selected from the group consisting of lauryl dimethyl aminoxide, lauryl diethyl aminoxide, myristyl dimethyl aminoxide, myristyl diethyl aminoxide, cetyl dimethyl aminoxide, cetyl diethyl aminoxide, dihexyl ethyl aminoxide, dioctyl methyl aminoxide and the corresponding compounds in which the methyl and ethyl groups contain a hydroxy group.

References Cited
UNITED STATES PATENTS

| | | | |
|---|---|---|---|
| 2,169,976 | 8/1939 | Guenther et al. | 260—583 X |
| 3,098,794 | 7/1963 | Dohr et al. | 260—584 X |
| 3,194,768 | 7/1965 | Lindner et al. | 252—186 X |
| 3,223,647 | 12/1965 | Drew et al. | 252—137 |
| 3,252,979 | 5/1966 | Oswald et al. | 260—584 X |

LEON D. ROSDOL, *Primary Examiner.*

M. WEINBLATT, *Assistant Examiner.*